United States Patent
Shibata et al.

(10) Patent No.: US 11,374,258 B2
(45) Date of Patent: Jun. 28, 2022

(54) ELECTROLYTE COMPOSITION, ELECTROLYTE MEMBRANE, ELECTRODE, CELL AND METHOD FOR EVALUATING ELECTROLYTE COMPOSITION

(71) Applicant: NIPPON SHOKUBAI CO., LTD., Osaka (JP)

(72) Inventors: Shin-ya Shibata, Osaka (JP); Motohiro Arakawa, Osaka (JP)

(73) Assignee: Nippon Shokubai Co., Ltd., Osaka (JP)

( * ) Notice: Subject to any disclaimer, the term of this patent is extended or adjusted under 35 U.S.C. 154(b) by 11 days.

(21) Appl. No.: 16/625,500

(22) PCT Filed: Jun. 19, 2018

(86) PCT No.: PCT/JP2018/023306
§ 371 (c)(1),
(2) Date: Dec. 20, 2019

(87) PCT Pub. No.: WO2019/004011
PCT Pub. Date: Jan. 3, 2019

(65) Prior Publication Data
US 2021/0135283 A1 May 6, 2021

(30) Foreign Application Priority Data
Jun. 27, 2017 (JP) .............................. JP2017-125319

(51) Int. Cl.
| H01M 10/0565 | (2010.01) |
| H01M 50/44 | (2021.01) |
| C08K 5/315 | (2006.01) |
| C08K 5/42 | (2006.01) |
| C08L 71/02 | (2006.01) |

(52) U.S. Cl.
CPC ......... *H01M 10/0565* (2013.01); *C08K 5/315* (2013.01); *C08K 5/42* (2013.01); *C08L 71/02* (2013.01); *H01M 50/44* (2021.01); *H01M 2300/0082* (2013.01)

(58) Field of Classification Search
None
See application file for complete search history.

(56) References Cited

U.S. PATENT DOCUMENTS

| 5,356,553 | A | 10/1994 | Kono et al. | |
| 7,906,237 | B2* | 3/2011 | Adachi | H01M 10/0568 429/218.1 |
| 2004/0202912 | A1* | 10/2004 | Nishiura | C08G 65/329 429/330 |
| 2009/0111012 | A1* | 4/2009 | Shibuya | H01M 4/137 429/163 |
| 2012/0244425 | A1 | 9/2012 | Tokuda | |
| 2013/0084493 | A1 | 4/2013 | Tokuda | |
| 2016/0028110 | A1 | 1/2016 | Yu et al. | |
| 2016/0218349 | A1 | 7/2016 | Hasegawa et al. | |
| 2016/0233549 | A1 | 8/2016 | Tiruvannamalai et al. | |
| 2017/0092985 | A1* | 3/2017 | Sugita | H01M 10/052 |
| 2017/0179481 | A1 | 6/2017 | Yamada et al. | |
| 2017/0317374 | A1 | 11/2017 | Takahashi | |
| 2018/0115018 | A1 | 4/2018 | Shimoyama et al. | |
| 2018/0183034 | A1* | 6/2018 | Asakawa | H01M 10/0568 |
| 2018/0226686 | A1* | 8/2018 | Tanaka | H01M 10/0525 |

FOREIGN PATENT DOCUMENTS

| JP | 63-193954 | | 8/1988 |
| JP | 5-109311 | | 4/1993 |
| JP | 2006-318674 | | 11/2006 |
| JP | 2012-256506 | | 12/2012 |
| JP | 2014-185195 | | 10/2014 |
| JP | 2014-241198 | | 12/2014 |
| JP | 2015-026625 | | 2/2015 |
| JP | 2015-069795 | | 4/2015 |
| JP | 2015-168754 | | 9/2015 |
| JP | 2015-537352 | | 12/2015 |
| JP | 2017-010924 | | 1/2017 |
| KR | 10-2004-000129 | * | 1/2004 |
| KR | 10-2015-0061538 | | 6/2015 |
| WO | 2015/045921 | | 4/2015 |
| WO | WO 2015/186517 | * | 12/2015 |
| WO | 2016/071798 | | 5/2016 |
| WO | 2016/130484 | | 8/2016 |
| WO | 2016/147811 | | 9/2016 |
| WO | WO2017/026094 | * | 2/2017 |

OTHER PUBLICATIONS

Machine translation of KR 10-2004-000129, published on Jan. 3, 2004 (Year: 2004).*
Lithium bis(fluorosulfonyl)imide, Sigma-Aldrich, 2021 (Year: 2021).*
M. Echeverri et al., "Ionic Conductivity in Relation to Ternary Phase Diagram of Poly(ethylene oxide), Succinonitrile, and Lithium Bis(trifluoromethane) sulfonimide Blends", Macromolecules, 2012,45 (15), p. 6068-6077.
M. Echeverri et al., "Highly conductive, completely amorphous polymer electrolyte membranes fabricated through photo-polymerization of poly(ethylene glycol) diacrylate) in mixtures of solid plasticizer and lithium salt", Solid State Ionics, 2014, 254, p. 92-100.
English translation of the International Preliminary Report on Patentability issued in International Application No. PCT/JP2018/023306, dated Nov. 4, 2019, 7 pages.
Office Action issued in Japanese Paten Application No. 2020-534132, dated Mar. 2, 2022, 5 pages—translation only.

(Continued)

*Primary Examiner* — Anca Eoff
(74) *Attorney, Agent, or Firm* — Hamre, Schumann, Mueller & Larson, P.C.

(57) ABSTRACT

The present invention provides an electrolyte composition that provides better charging/discharging performance when used in a cell than a conventional electrolyte composition. The present invention relates to an electrolyte composition containing an alkali metal salt, at least one polymer selected from the group consisting of a polyether polymer, a (meth) acrylic polymer, a nitrile polymer, and a fluoropolymer, and an ion dissociation accelerator. The composition has an alkali metal salt concentration of 1.8 mol/kg or higher.

10 Claims, 2 Drawing Sheets

(56) References Cited

OTHER PUBLICATIONS

Office Action issued in Japanese Patent Application No. 2017-125318, dated Aug. 5, 2021, 4 pages—translation only.

* cited by examiner

ELECTROLYTE COMPOSITION, ELECTROLYTE MEMBRANE, ELECTRODE, CELL AND METHOD FOR EVALUATING ELECTROLYTE COMPOSITION

TECHNICAL FIELD

The present invention relates to electrolyte compositions, electrolyte membranes, electrodes, cells, and methods for evaluating an electrolyte composition. Specifically, the present invention relates to an electrolyte composition suitable for a material for cells such as lithium-ion cells, an electrolyte membrane and an electrode each containing the electrolyte composition, a cell including these components, and a method for evaluating an electrolyte composition.

BACKGROUND ART

In recent years, there has been a growing concern about environmental issues, which has led to a progress in conversion of the energy resources from fossil fuels such as petroleum and coal to alternative energy resources. At the same time, the importance of batteries is increasing and the demand for batteries is expected to increase. Among alternative energy resources, secondary batteries which can be repeatedly charged and discharged are more used not only for electronic devices such as cell phones and laptops but also in other various fields such as cars and aircraft. Thus, various secondary batteries and materials for secondary batteries have been researched and developed. In particular, large-capacity, light-weight lithium ion batteries are secondary batteries the use of which is most expected to be expanded and are batteries that are most actively researched and developed.

In the research and development of such batteries, techniques have been developed to improve the ionic conductivity of an electrolyte for solid-state batteries. For example, Patent Literature 1 and Patent Literature 2 each disclose an electrolyte containing a lithium salt and an ether polymer. Patent Literature 3 discloses a polymer electrolyte material containing an aliphatic polycarbonate that contains a structural unit having a predetermined structure and lithium bis(fluorosulfonyl)imide as an electrolyte salt compound. Non-Patent Literature 1 discloses a composition containing polyethylene oxide, succinonitrile, and lithium bis(trifluoromethanesulfonyl)imide.

CITATION LIST

Patent Literature

Patent Literature 1: JP S63-193954 A
Patent Literature 2: JP 2006-318674 A
Patent Literature 3: JP 2014-185195 A cl Non-Patent Literature
Non-Patent Literature 1: M. Echeverri and two other persons, "Macromolecules", (United States), 2012, 45, pp. 6068-6077

SUMMARY OF INVENTION

Technical Problem

Various electrolytes and electrolyte compositions have been developed as described above. However, such conventional electrolytes and electrolyte compositions are insufficient in charging/discharging performance when used in a cell.

The present invention has been made in view of the state of the art and aims to provide an electrolyte composition that provides better charging/discharging performance when used in a cell than a conventional electrolyte composition. The present invention also aims to provide an electrolyte membrane, an electrode, and a cell each including the electrolyte composition. The present invention also aims to provide a method for simply evaluating the charging/discharging performance provided by an electrolyte composition.

Solution to Problem

The present inventors conducted various studies on electrolyte compositions and found that an electrolyte composition containing an alkali metal salt, a specific polymer, and an ion dissociation accelerator and having an alkali metal salt concentration of 1.8 mol/kg or higher provides better charging/discharging performance when used in a cell than a conventional electrolyte composition. The performance of an electrolyte composition has been conventionally evaluated using the ionic conductance of the electrolyte as an indicator. The present inventors found that the charging/discharging performance of a cell is more highly correlated with the ionic conductivity represented by a resistance value determined from a voltage rise value and a current value when a direct current is applied between two alkali metal pieces with an electrolyte composition in between than with the ionic conductance that is the indicator conventionally used. Thereby, they arrived at an admirable solution to the problems, completing the present invention.

That is, one aspect of the present invention is an electrolyte composition including:

an alkali metal salt;
at least one polymer selected from the group consisting of a polyether polymer, a (meth)acrylic polymer, a nitrile polymer, and a fluoropolymer; and
an ion dissociation accelerator,
the composition having an alkali metal salt concentration of 1.8 mol/kg or higher.

The alkali metal salt is preferably represented by the following formula (1):

$$MN(SO_2R^1)(SO_2R^2) \qquad (1)$$

wherein M is an alkali metal ion, and $R^1$ and $R^2$ are the same as or different from each other and each represent a fluorine atom or a C1-C3 fluoroalkyl group.

The polymer preferably includes a polyether polymer containing a structural unit derived from ethylene oxide.

The ion dissociation accelerator preferably contains at least one of a nitrile compound or a sulfonyl compound.

The nitrile compound is preferably a dinitrile compound represented by the following formula (2):

[Chem. 1]

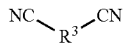

(2)

wherein $R^3$ is a C1-C6 alkylene group or a C6-C10 arylene group.

The ion dissociation accelerator is preferably ethylene carbonate.

Another aspect of the present invention is an electrolyte membrane including the electrolyte composition.

The electrolyte membrane preferably further includes a separator.

The separator preferably includes at least one selected from the group consisting of a cellulose non-woven fabric, a PET non-woven fabric, a glass non-woven fabric, a polyolefin non-woven fabric, a polyolefin microporous membrane, and a polyimide porous membrane.

Yet another aspect of the present invention is an electrode including the electrolyte composition.

Yet another aspect of the present invention is an alkali metal cell including at least one of the electrolyte membrane or the electrode.

Yet another aspect of the present invention is a method for evaluating an electrolyte composition containing an alkali metal salt, the method including applying a direct current between two alkali metal pieces with an electrolyte composition in between to determine a resistance value from a voltage rise value and a current value.

Advantageous Effects of Invention

The electrolyte composition of the present invention having the above features can provide better charging/discharging performance when used in a cell than a conventional electrolyte composition, and is thus suitable for a material of cells such as lithium-ion cells. The method for evaluating the electrolyte composition of the present invention having the above features can simply evaluate the charging/discharging performance provided by an electrolyte composition and can be suitably used in production of an electrolyte composition, for example.

DESCRIPTION OF EMBODIMENTS

Figure 1:
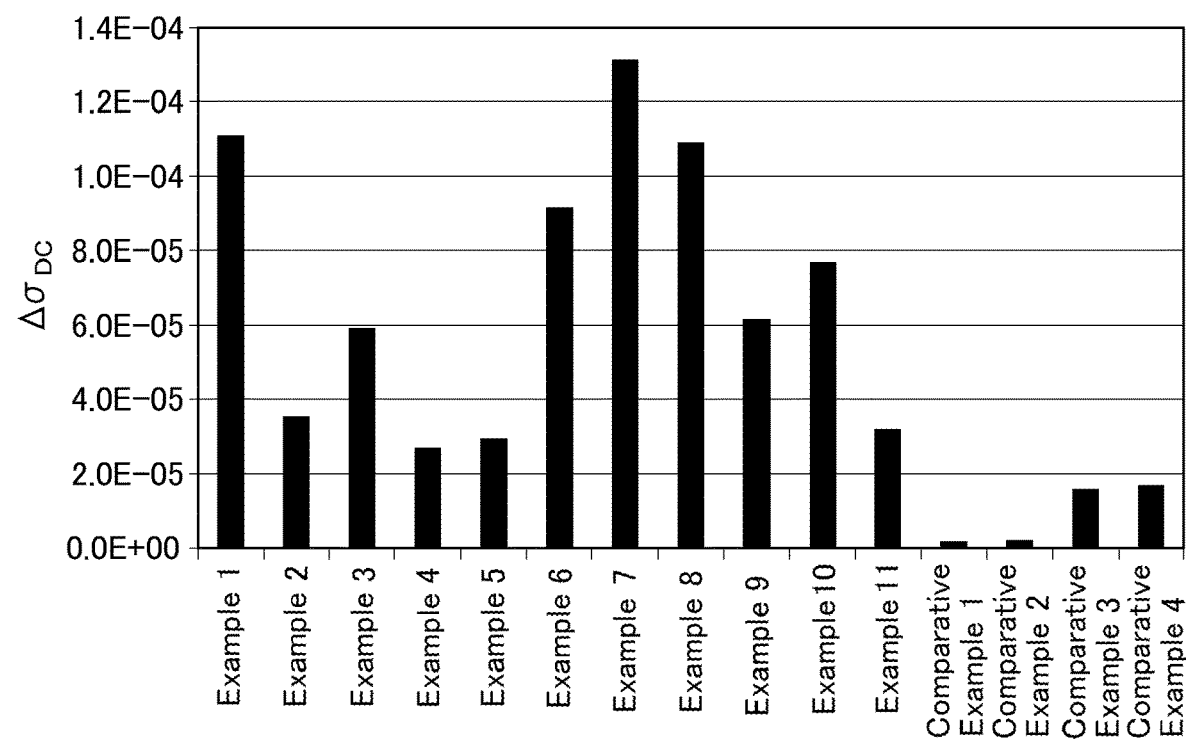
FIG. 1 shows the measurement results of the ionic conductances of the electrolyte membranes produced in Examples 1 to 11 and Comparative Examples 1 to 4.

The following description is offered to specifically describe preferred embodiments of the present invention. It should be noted that the present invention is not limited only to these embodiments, and the embodiments can be appropriately modified within the scope of the present invention. Any combination of two or more preferred embodiments of the present invention to be mentioned below is also a preferred embodiment of the present invention.

[Electrolyte Composition]

The electrolyte composition of the present invention contains an alkali metal salt, at least one polymer selected from the group consisting of a polyether polymer, a (meth)acrylic polymer, a nitrile polymer, and a fluoropolymer, and an ion dissociation accelerator, the composition having an alkali metal salt concentration of 1.8 mol/kg or higher. The electrolyte composition of the present invention can have excellent ionic conductivity owing to the synergistic effect of the presence of such particular compounds and the alkali metal salt concentration of 1.8 mol/kg or higher. In such a case where the alkali metal salt concentration in the electrolyte composition is high, the conduction pathways formed by anions are considered to be greatly involved in the conduction of alkali metal ions. Thus, the present invention has special technical significance in that the composition has an alkali metal salt concentration of 1.8 mol/kg or higher and contains an ion dissociation accelerator to dissociate the alkali metal salt into alkali metal ions and anions in the composition.

Although an electrolyte composition having a high alkali metal salt concentration is known to have poor film forming properties, the electrolyte composition of the present invention having the above particular structure also has excellent film forming properties.

The alkali metal salt concentration is preferably 2.0 mol/kg or higher, still more preferably 2.2 mol/kg or higher, particularly preferably 2.5 mol/kg or higher. The alkali metal salt concentration is preferably 5.3 mol/kg or lower, more preferably 5.0 mol/kg or lower, still more preferably 4.6 mol/kg or lower.

The electrolyte composition preferably contains the alkali metal salt in an amount of 51% to 99% by mass based on 100% by mass of the electrolyte composition. The amount is more preferably 52% to 98% by mass, still more preferably 55% to 95% by mass.

The electrolyte composition may contain any amount of the at least one polymer selected from the group consisting of a polyether polymer, a (meth)acrylic polymer, a nitrile polymer, and a fluoropolymer. The amount is preferably 0.5% to 45% by mass, more preferably 1% to 45% by mass, still more preferably 3% to 40% by mass, particularly preferably 5% to 30% by mass, based on 100% by mass of the electrolyte composition. Here, when the at least one polymer includes two or more polymers, the amount of the at least one polymer refers to the total amount of the two or more polymers.

The electrolyte composition may contain any amount of the ion dissociation accelerator. The amount is preferably 0.5% to 45% by mass based on 100% by mass of the electrolyte composition. Such an amount of the ion dissociation accelerator leads to sufficient dissociation of ions even when the alkali metal salt concentration is high. Thus, the ionic conductivity of the electrolyte composition is further increased. The amount of the ion dissociation accelerator is more preferably 1% to 45% by mass, still more preferably 3% to 40% by mass, particularly preferably 5% to 30% by mass.

The electrolyte composition may further contain a different component other than the alkali metal salt, the polymer(s), and the ion dissociation accelerator. The amount of the different component is preferably 0% to 20% by mass, more preferably 0% to 15% by mass, still more preferably 0% to 10% by mass, based on 100% by mass of the electrolyte composition.

The following describes the essential components and optional components in the electrolyte composition of the present invention.

<Alkali Metal Salt>

The alkali metal salt may be any one. Examples of the alkali metal of the alkali metal salt include lithium, sodium, potassium, rubidium, cesium, and francium. Preferred are lithium, sodium, and potassium, with lithium being more preferred.

Examples of the alkali metal salt include alkali metal salts of fluorosulfonic acid, such as $LiFSO_3$; alkali metal salts of trifluoromethanesulfonic acid, such as $LiCF_3SO_3$; imide alkali metal salts such as $LiN(FSO_2)_2$; alkali metal salts of a perfluoroalkanesulfonylmethide, such as $LiC(CF_3SO_2)_3$;

fluorophosphates such as $LiPF_a(C_mF_{2m+1})_{6-a}$ (0≤a≤6, 1≤m≤2); alkali metal salts of perchloric acid, such as $LiClO_4$; fluoroborates such as $LiBF_b(C_nF_{2n+1})_{4-b}$ (0≤b≤4, 1≤n≤2); alkali metal salts of (oxalato)borate, such as LiBOB; cyanoborates such as lithium tetracyanoborate; and alkali metal salts such as $LiAsF_6$, LiI, and $LiSbF_6$.

Preferred among these is a compound represented by the following formula (1):

$$MN(SO_2R^1)(SO_2R^2) \qquad (1)$$

wherein M is an alkali metal ion, and $R^1$ and $R^2$ are the same as or different from each other and each represent a fluorine atom or a C1-C3 fluoroalkyl group.

Examples of the alkali metal for M are the same as those described above.

The C1-C3 fluoroalkyl group for $R^1$ and $R^2$ may have a structure in which at least one hydrogen atom in a C1-C3 hydrocarbon group is replaced by a fluorine atom. Specific examples of the C1-C3 fluoroalkyl group include fluoromethyl, difluoromethyl, trifluoromethyl, fluoroethyl, difluoroethyl, trifluoroethyl, and pentafluoroethyl groups. $R^1$ and $R^2$ are each preferably a fluorine atom, a trifluoromethyl group, or a pentafluoroethyl group, more preferably a fluorine atom or a trifluoromethyl group, most preferably a fluorine atom.

When the electrolyte composition contains $LiN(FSO_2)_2$, the amount of $LiN(FSO_2)_2$ is preferably 51% to 98% by mass, more preferably 55% to 95% by mass, still more preferably 60% to 90% by mass, based on 100% by mass of the electrolyte composition.

<Polymer>

The polymer is at least one polymer selected from the group consisting of a polyether polymer, a (meth)acrylic polymer, a nitrile polymer, and a fluoropolymer.

Non-limiting examples of the (meth)acrylic polymer include homopolymers of (meth)acrylic acid and (meth) acrylate and copolymers of these monomers and a different monomer.

Examples of the (meth)acrylate include methyl (meth) acrylate, ethyl (meth)acrylate, butyl (meth)acrylate, 2-ethylhexyl (meth) acrylate, cyclohexyl (meth) acrylate, phenyl (meth)acrylate, benzyl (meth)acrylate, dicyclopentanyl (meth) acrylate, isobornyl (meth) acrylate, 2-(acetoacetoxy) ethyl (meth) acrylate, polyoxyalkylene glycol (meth)acrylate, methoxypolyalkylene glycol (meth)acrylate, phenoxypolyalkylene glycol (meth)acrylate, and cyanoethyl (meth) acrylate.

Examples of the different monomer include hydroxy group-containing (meth)acrylates such as 2-hydroxyethyl (meth)acrylate, 2-hydroxypropyl (meth)acrylate, 3-hydroxypropyl (meth)acrylate, 4-hydroxybutyl (meth)acrylate, methyl (α-hydroxymethyl)acrylate, ethyl (α-hydroxymethyl)acrylate, caprolactone-modified hydroxy (meth) acrylate, and 4-hydroxymethylcyclohexyl methyl (meth)acrylate; acid functional group-containing polymerizable monomers such as maleic acid, fumaric acid, crotonic acid, itaconic acid, maleic anhydride, carboxyl-terminated caprolactone-modified (meth)acrylate, sulfoethyl (meth)acrylate, and 2-(meth)acryloyloxyethyl acid phosphate; vinyl compounds such as styrene, α-methylstyrene, vinyl toluene, divinylbenzene, vinyl acetate, vinyl chloride, and vinylidene chloride; silicon-containing polymerizable monomers such as vinyl trichlorosilane, vinyltris(β-methoxyethoxy)silane, and vinyltriethoxysilane; halogen-containing (meth)acrylates such as trifluoroethyl (meth) acrylate, octafluoropentyl (meth) acrylate, heptadodecafluorodecyl (meth) acrylate, and perfluorooctylethyl (meth) acrylate; nitrogen-containing polymerizable monomers such as (meth)acrylamide, N,N-dimethylaminopropyl (meth)acrylamide, N-isopropyl (meth)acrylamide, N-methylol (meth)acrylamide, N,N'-dimethylaminoethyl (meth) acrylate, N-methyl-N-vinylformamide, N-vinylpyridine, N-vinylimidazole, N-vinylpyrrolidone, N-phenylmaleimide, N-cyclohexylmaleimide, 2-isopropenyl-2-oxazoline, and acrylonitrile; polyfunctional polymerizable monomers such as ethylene glycol di(meth) acrylate, diethylene glycol di(meth)acrylate, triethylene glycol di(meth)acrylate, polyethylene glycol di(meth)acrylate, 1,4-butanediol di(meth)acrylate, 1,6-hexanediol di(meth) acrylate, polypropylene glycol di(meth)acrylate, pentaerythritol tri(meth)acrylate, vinyloxyethyl (meth)acrylate, and vinyloxyethoxy ethyl (meth)acrylate; epoxy group-containing polymerizable monomers such as glycidyl (meth)acrylate, α-methylglycidyl (meth) acrylate, and 3,4-epoxycyclohexylmethyl (meth) acrylate; isocyanate group-containing polymerizable monomers such as 2-(meth)acryloyloxyethyl isocyanate, (meth)acryloylisocyanate, and m-isopropenyl-α, α-dimethylbenzyl isocyanate; 4-(meth)acryloyloxy-2,2,6,6-tetramethylpiperidine; and 1-(meth)acryloyl-4-cyano-4-(meth)acryloylamino-2,2,6,6-tetramethylpiperidine;

monofunctional vinyl ethers such as methyl vinyl ether, ethyl vinyl ether, propyl vinyl ether, butyl vinyl ether, 2-ethylhexyl vinyl ether, n-nonyl vinyl ether, cyclohexyl vinyl ether, methoxyethyl vinyl ether, ethoxyethyl vinyl ether, methoxyethoxyethyl vinyl ether, ethoxyethoxyethyl vinyl ether, methoxypolyethylene glycol vinyl ether, 2-hydroxyethyl vinyl ether, 4-hydroxybutyl vinyl ether, diethylene glycol monovinyl ether, polyethylene glycol monovinyl ether, and chloroethyl vinyl ether; and monofunctional vinyl compounds such as styrene, α-methylstyrene, vinyl toluene, allyl acetate, vinyl acetate, vinyl propionate, and vinyl benzoate.

Non-limiting examples of the nitrile polymer include a homopolymer of acrylonitrile and copolymers of acrylonitrile and a different monomer.

Examples of the different monomer are the same as those described for the (meth)acrylic polymer.

The nitrile polymer preferably contains a structural unit derived from acrylonitrile in a proportion of 30% to 100% by mass, more preferably 50% to 100% by mass, still more preferably 70% to 100% by mass, based on 100% by mass of all structural units.

Non-limiting examples of the fluoropolymer include homopolymers of vinylidene fluoride (VdF), hexafluoropropylene (HFP), and tetrafluoroethylene (TFE) and copolymers of these monomers and a different monomer.

Examples of the different monomer include monomers described for the (meth)acrylic polymer and the above (meth)acrylates, ethylene, propylene, vinyl ethers, and vinyl esters.

In the fluoropolymer, the sum of the proportions of the structural units derived from VdF, HFP, and TFE is preferably 30% to 100% by mass, more preferably 50% to 100% by mass, still more preferably 70% to 100% by mass, particularly preferably 90% to 100% by mass, based on 100% by mass of all structural units.

The polyether polymer may be any one containing a structural unit derived from an alkylene oxide. It preferably contains a structural unit derived from ethylene oxide (hereinafter, also referred to as structural unit (a)).

The polyether polymer may further contain a structural unit (b) represented by the following formula (3):

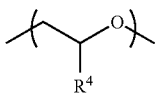
(3)

(wherein $R^4$s are the same as or different from each other and are each a C1-C3 hydrocarbon group), and/or a structural unit (c) represented by the following formula (4):

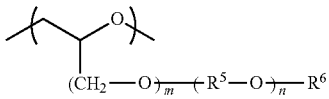
(4)

(wherein $R^5$s are the same as or different from each other and are each a linear or branched C1-C8 hydrocarbon group; $R^6$s are the same as or different from each other and are each a C1-C12 hydrocarbon group optionally containing a functional group; n is an integer of 0 to 12; and m is 0 or 1).

The polyether polymer preferably contains the structural unit (a) and the structural unit (b).

The polyether polymer including a side-chain functional group containing an ether linkage can have enhanced mobility of the polymer, and thus can enhance the ionic conductivity, in particular, Li ionic conductivity.

The proportion of the structural unit (a) in the polyether polymer is preferably 40 to 100 mol %, more preferably 70 to 100 mol %, still more preferably 90 to 100 mol %, based on 100 mol % of all structural units.

The proportion of the structural unit (b) in the polyether polymer is preferably 0 to 30 mol %, more preferably 0 to 20 mol %, still more preferably 0 to 10 mol %, based on 100 mol % of all structural units.

The proportion of the structural unit (c) in the polyether polymer is preferably 0 to 30 mol %, more preferably 0 to 20 mol %, still more preferably 0 to 10 mol %, based on 100 mol % of all structural units.

$R^4$s in the formula (3) are the same as or different from each other and are each a C1-C3 hydrocarbon group. Examples of the C1-C3 hydrocarbon group include a methyl group and an ethyl group. $R^4$ is preferably an ethyl group.

Here, the expression "are the same as or different from each other" means that when the polyether polymer contains multiple structural units each represented by the formula (3), $R^4$s in the respective structural units may be the same as or different from each other.

Examples of a starting monomer for introducing the structural unit represented by the formula (3) into the polyether polymer include propylene oxide or butylene oxide. In particular, butylene oxide is preferred.

$R^5$s in the formula (4) are the same as or different from each other and are each a linear or branched C1-C8 hydrocarbon group. The carbon number of $R^5$ is preferably 1 to 6, more preferably 1 to 4. Examples of the linear or branched C1-C8 hydrocarbon group include linear alkylene groups such as methylene (—$CH_2$—), ethylene (—$CH_2CH_2$—), trimethylene (—$CH_2CH_2CH_2$—), and tetramethylene (—$CH_2CH_2CH_2CH_2$—); and branched alkylene groups such as ethylidene [—CH($CH_3$)—], propylene [—CH($CH_3$)$CH_2$—], propylidene [—CH($CH_2CH_3$)—], isopropylidene [—C($CH_3$)$_2$—], butylene [—CH($CH_2CH_3$)$CH_2$—], isobutylene [—C($CH_3$)$_2CH_2$—], butylidene [—CH($CH_2CH_2CH_3$)—], and isobutylidene [—CH(CH($CH_3$)$_2$)—].

Preferred among these are linear alkylene groups such as methylene, ethylene, trimethylene, and tetramethylene and branched alkylene groups such as propylene, propylidene, butylene, and butylidene to achieve high ionic conductance. More preferred are methylene, ethylene, trimethylene, tetramethylene, propylene, propylidene, and butylene, with methylene, ethylene, propylene, and butylene being still more preferred.

In the formula (4), one type or two or more types of $R^5$s may be present. When two or more types of $R^5$s are present, the addition of oxyalkylene groups each represented by —($R^5$—O)— may be performed by block addition or random addition, for example.

In the formula (4), n is an average number of moles of the group represented by $R^5$O groups added and is an integer of 0 to 12. Preferably, n is 1 to 8 although it depends on the type of the oxyalkylene group represented by $R^5$O. The polyether polymer containing an oxyalkylene group in a side chain can provide better ionic conductivity. The average number n is more preferably 1 to 6, still more preferably 1 to 4.

In the formula (4), m is 0 or 1, and when n is 0, m is preferably 1.

$R^6$s in the formula (4) are the same as or different from each other and are each a C1-C12 hydrocarbon group optionally containing a functional group. Non-limiting examples of the hydrocarbon group include alkyl, cycloalkyl, aryl, aralkyl, and alkenyl groups.

When the hydrocarbon group is an aryl group, the carbon number of the hydrocarbon group is preferably 6 to 12, more preferably 6 to 8. When the hydrocarbon group is not an aryl group, the carbon number of the hydrocarbon group is more preferably 1 to 8, still more preferably 1 to 4.

The hydrocarbon group is preferably an alkyl group, more preferably methyl, ethyl, n-propyl, isopropyl, n-butyl, n-hexyl, n-octyl, isobutyl, sec-butyl, or tert-butyl, still more preferably methyl, ethyl, n-propyl, isopropyl, or n-butyl.

The polyether polymer containing the structural unit represented by the formula (4) may be produced using a monomer such as methoxyethyl glycidyl ether, propoxyethyl glycidyl ether, butoxyethyl glycidyl ether, methoxyethoxyethyl glycidyl ether, propoxyethoxyethyl glycidyl ether, butoxyethoxyethyl glycidyl ether, triethylene glycol methyl glycidyl ether, triethylene glycol propyl glycidyl ether, triethylene glycol butyl glycidyl ether, or tetraethylene glycol methyl glycidyl ether.

The polyether polymer may contain a different structural unit other than the structural units (a), (b), and (c). Non-limiting examples of the different structural unit include a structural unit containing a crosslinkable functional group in a side chain.

The polyether polymer including the structural unit containing a crosslinkable functional group in a side chain enables easy formation of an electrolyte membrane without a separator.

The polyether polymer including the structural unit containing a crosslinkable functional group in a side chain may be produced using a monomer such as epoxybutene, 3,4-epoxy-1-pentene, 1,2-epoxy-5,9-cyclododecadiene, 3,4-epoxy-1-vinylcyclohexene, 1,2-epoxy-5-cyclooctene, glycidyl acrylate, glycidyl methacrylate, glycidyl sorbate, glycidyl-4-hexanoate, vinyl glycidyl ether, allyl glycidyl ether, 4-vinylcyclohexyl glycidyl ether, α-terpenyl glycidyl ether, cyclohexenylmethyl glycidyl ether, 4-vinylbenzyl glycidyl ether, 4-allylbenzyl glycidyl ether, allyl glycidyl ether, ethylene glycol allyl glycidyl ether, ethylene glycol vinyl glycidyl ether, diethylene glycol allyl glycidyl ether, diethylene glycol vinyl glycidyl ether, triethylene glycol allyl glycidyl ether, triethylene glycol vinyl glycidyl ether, oligoethylene glycol allyl glycidyl ether, or oligoethylene glycol vinyl glycidyl ether. Preferred among these are epoxybutene and allyl glycidyl ether, with allyl glycidyl ether being more preferred.

The polyether polymer preferably contains the different structural unit in a proportion of 0 to 10 mol % based on 100 mol % in total of all structural units forming the polyether polymer.

When the polyether polymer contains the structural unit containing a crosslinkable functional group in a side chain and the proportion of the structural unit is 10 mol % or less, a membrane formed from the electrolyte composition can be sufficiently prevented from hardening, and thus can have excellent ionic conductivity.

The proportion of the different structural unit in the polyether polymer is more preferably 0.1 to 7 mol %, still more preferably 0.5 to 5 mol %.

The polyether polymer preferably has a weight average molecular weight of 10,000 to 300,000. When the weight average molecular weight is 10,000 or greater, the polyether polymer can lead to better film forming properties in forming a film from the electrolyte composition. When the weight average molecular weight is 300,000 or less, the resulting membrane can sufficiently be prevented from hardening, and thus can have excellent ionic conductivity.

The weight average molecular weight is more preferably 30,000 to 200,000, still more preferably 50,000 to 150,000.

The weight average molecular weight can be determined by the same method as in the examples described later.

<Ion Dissociation Accelerator>

The ion dissociation accelerator may be any one that promotes dissociation of the alkali metal salt into ions and is preferably a compound containing a heteroelement.

Examples of the compound containing a heteroelement include a sulfonyl compound, a nitrile compound, a carbonate compound, a carboxylic anhydride, a sulfate compound, a thioether compound, a sulfite compound, and a nitrogen-containing cyclic compound.

These may be used alone or in combination of two or more thereof.

Preferred among these are a sulfonyl compound, a nitrile compound, and a carbonate compound. Use of at least one of a sulfonyl compound, a nitrile compound, or a carbonate compound as the ion dissociation accelerator can further promotes dissociation of the alkali metal salt into ions. Thus, the ionic conductivity of the composition is further enhanced.

The ion dissociation accelerator is more preferably a nitrile compound or a carbonate compound.

Examples of the sulfonyl compound include sulfones such as dimethyl sulfone, ethyl methyl sulfone, diethyl sulfone, n-propyl methyl sulfone, isopropyl methyl sulfone, n-butyl methyl sulfone, and tert-butyl methyl sulfone; sulfolanes such as sulfolane (tetramethylene sulfone), 2-methylsulfolane, 3-methylsulfolane, and 2,4-dimethylsulfolane; sultones such as sultone, 1,3-propane sultone, and 1,4-butane sultone; busulfan; and sulfolenes.

The sulfonyl compound preferably includes sulfolanes, with sulfolane being more preferred.

Examples of the nitrile compound include a mononitrile compound and a dinitrile compound.

Examples of the mononitrile compound include propionitrile, butyronitrile, pentanenitrile, hexanenitrile, heptanenitrile, octanenitrile, pelargononitrile, decanenitrile, undecanenitrile, dodecanenitrile, cyclopentanecarbonitrile, cyclohexanecarbonitrile, acrylonitrile, methacrylonitrile, crotononitrile, 3-methylcrotononitrile, 2-methyl-2-butenenitrile, 2-pentenenitrile, 2-methyl-2-pentenenitrile, 3-methyl-2-pentenenitrile, and 2-hexenenitrile.

Examples of the dinitrile compound include malononitrile, succinonitrile, glutaronitrile, adiponitrile, pimelonitrile, suberonitrile, azelanitrile, sebaconitrile, undecanedinitrile, dodecanedinitrile, methylmalononitrile, ethylmalononitrile, isopropylmalononitrile, tert-butylmalononitrile, methylsuccinonitrile, 2,2-dimethylsuccinonitrile, 2,3-dimethylsuccinonitrile, 2,3,3-trimethylsuccinonitrile, 2,2,3,3-tetramethylsuccinonitrile, 2,3-diethyl-2,3-dimethylsuccinonitrile, 2,2-diethyl-3,3-dimethylsuccinonitrile, bicyclohexyl-1,1-dicarbonitrile, bicyclohexyl-2,2-dicarbonitrile, bicyclohexyl-3,3-dicarbonitrile, 2,5-dimethyl-2,5-hexanedicarbonitrile, 2,3-diisobutyl-2,3-dimethylsuccinonitrile, 2,2-diisobutyl-3,3-dimethylsuccinonitrile, 2-methylglutaronitrile, 2,3-dimethylglutaronitrile, 2,4-dimethylglutaronitrile, 2,2,3,3-tetramethylglutaronitrile, 2,2,4,4-tetramethylglutaronitrile, 2,2,3,4-tetramethylglutaronitrile, 2,3,3,4-tetramethylglutaronitrile, maleonitrile, fumaronitrile, 1,4-dicyanopentane, 2,6-dicyanoheptane, 2,7-dicyanooctane, 2,8-dicyanononane, 1,6-dicyanodecane, 1,2-dicyanobenzene, 1,3-dicyanobenzene, 1,4-dicyanobenzene, 3,3'-(ethylenedioxy) dipropionitrile, 3,3'-(ethylenedithio)dipropionitrile, and 3, 9-bis(2-cyanoethyl)-2,4,8,10-tetraoxaspiro[5,5]undecane.

The nitrile compound is preferably a dinitrile compound, and more preferably a compound represented by the following formula (2):

(2)

wherein $R^3$ is a C1-C6 alkylene group or a C6-C10 arylene group.

$R^3$ is preferably a C1-C6 alkylene group. Examples of the C1-C6 alkylene group include: methylene, ethylene, n-propylene, isopropylene, n-butylene, t-butylene, n-pentylene, isopentylene, and n-hexylene groups.

The dinitrile compound is preferably malononitrile, succinonitrile, glutaronitrile, adiponitrile, pimelonitrile, or suberonitrile, more preferably malononitrile, succinonitrile, glutaronitrile, or adiponitrile.

Examples of the carbonate compound include cyclic carbonates such as ethylene carbonate (EC), propylene carbonate (PC), vinylene carbonate (VC), vinyl ethylene carbonate (VEC), methylvinylene carbonate (MVC), and ethylvinylene carbonate (EVC); fluorinated cyclic carbonates such as fluoroethylene carbonate and trifluoropropylene carbonate; and chain carbonates such as dimethyl carbonate (DMC), diethyl carbonate (DEC), and ethyl methyl carbonate (EMC). Preferred among these are ethylene carbonate, fluoroethylene carbonate, dimethyl carbonate, and ethyl methyl carbonate, with ethylene carbonate being more preferred.

Examples of the carboxylic anhydride include succinic anhydride, glutaric anhydride, maleic anhydride, citraconic anhydride, glutaconic anhydride, itaconic anhydride, diglycolic anhydride, cyclohexanedicarboxylic anhydride, cyclopentanetetracarboxylic dianhydride, and phenylsuccinic anhydride.

Examples of the sulfate compound include methyl methanesulfonate and trimethylene glycol sulfate.

Examples of the thioether compound include tetramethylthiuram monosulfide.

Examples of the sulfite compound include ethylene sulfite.

Examples of the nitrogen-containing cyclic compound include 1-methyl-2-pyrrolidinone, 1-methyl-2-piperidone, 3-methyl-2-oxazolidinone, 1,3-dimethyl-2-imidazolidinone, and N-methylsuccinimide.

The ion dissociation accelerator is more preferably malononitrile, succinonitrile, glutaronitrile, adiponitrile, ethylene carbonate, propylene carbonate, fluoroethylene carbonate, or sulfolane, still more preferably malononitrile, succinonitrile, glutaronitrile, ethylene carbonate, or propylene carbonate, most preferably succinonitrile or ethylene carbonate.

<Different Component>

The electrolyte composition of the present invention may further contain a different component other than the alkali metal salt, the polymer(s), and the ion dissociation accelerator. Examples of the different component include saturated hydrocarbon compounds such as heptane, octane, and cycloheptane; a polymerization inhibitor, a chain transfer agent, and a solvent which are used to produce the polymer; unreacted materials; and by-products from decomposition of the reaction materials.

[Cell Material]

The electrolyte composition of the present invention is suitable for various materials of cells, such as an electrolyte membrane and an electrode. The cell material including the electrolyte composition of the present invention is another aspect of the present invention.

<Electrolyte Membrane>

The electrolyte composition of the present invention is suitable for a material of an electrolyte membrane for a cell.

The electrolyte membrane containing the electrolyte composition of the present invention is another aspect of the present invention.

The electrolyte membrane may include a separator (hereinafter, also referred to as a support). This can increase the mechanical strength of the electrolyte membrane.

It is a preferred embodiment of the present invention that the electrolyte membrane further includes a separator.

Non-limiting examples of the separator include a woven fabric, a non-woven fabric, a (micro)porous membrane, and a glass molded body.

The woven fabric and the non-woven fabric each may be formed from, for example, polyolefin resin such as polypropylene, polyethylene, or polymethylpentene; polyester resin such as polyethylene terephthalate (PET); polyamide resin such as nylon; aramid resin such as polyparaphenylene terephthalamide; acrylic resin; poly(vinyl alcohol) resin; cellulose resin (cellulose fiber); alumina fiber; ceramic fiber; or glass fiber.

The (micro)porous membrane may be formed from, for example, polyolefin resin such as polypropylene, polyethylene, or an ethylene-propylene copolymer; fluororesin such as polyester resin or a tetrafluoroethylene-perfluoroalkoxyethylene copolymer; polyether ether ketone; polybutylene terephthalate; polyphenylene sulfide; polyamide resin; or polyimide.

The glass molded body may be, for example, a glass fiber cloth.

These separators may be hydrophilized to enhance the hydrophilicity by introducing a surfactant; sulfonation, fluorination, or grafting using fuming sulfuric acid, chlorosulfonic acid, or other chemicals; corona discharge; or plasma discharge.

The separator preferably includes at least one selected from the group consisting of a cellulose non-woven fabric, a PET non-woven fabric, a glass non-woven fabric, a polyolefin non-woven fabric, a polyolefin microporous membrane, and a polyimide porous membrane. More preferred are a cellulose non-woven fabric and a polyolefin microporous membrane.

The electrolyte membrane formed from the electrolyte composition of the present invention preferably has a thickness (thickness of the electrolyte membrane including the support) of 5 to 300 µm, more preferably 10 to 250 µm, still more preferably 15 to 200 µm. The electrolyte membrane is preferably such that the ratio ($\alpha/\beta$) of the thickness ($\alpha$) of the electrolyte membrane of the present invention including the support to the thickness ($\beta$) of the support is 1.1 to 20. If the thickness of the electrolyte membrane including the support is equal to the thickness of the support alone (i.e., the electrolyte component is completely absorbed in the support and does not emerge on the surface), the electrolyte membrane may not sufficiently function as an electrolyte. If the thickness of the electrolyte membrane including the support exceeds 20 times the thickness of the support alone, the ion conduction distance is long, which may cause a failure in providing sufficient cell performance. The ratio ($\alpha/\beta$) of the thickness ($\alpha$) of the electrolyte membrane of the present invention including the support to the thickness ($\beta$) of the support is more preferably 1.1 to 10, still more preferably 1.1 to 8.

The electrolyte membrane may be produced by any method. To produce the electrolyte membrane including the support, the support is preferably coated or impregnated with an electrolyte solution containing the electrolyte composition, followed by drying.

The drying may be performed by any method, and it is preferably performed by heat-drying and/or reduced-pressure drying.

The drying temperature is set according to the boiling point of the solvent to be used. The drying temperature is preferably 100° C. or lower, more preferably 80° C. or lower. When the drying is performed at a temperature of 100° C. or lower, decomposition of the alkali metal salt and the polymer can be more sufficiently prevented.

To produce the electrolyte membrane not including the support, an electrolyte solution containing the electrolyte composition is preferably applied to a Teflon (R) sheet or another sheet, followed by drying. The drying may be performed by the same method as above.

When the electrolyte composition contains a crosslinkable functional group-containing polymer, for example, the composition is preferably cross-linked after drying.

The cross-linking reaction may be performed by heating or light application according to the type of the crosslinkable functional group. The polymerization reaction is preferably performed by light application.

<Electrode>

The electrolyte composition of the present invention is suitable for a material of a cell electrode.

An electrode including the electrolyte composition of the present invention is yet another aspect of the present invention. The electrolyte composition of the present invention is usable for both a positive electrode and a negative electrode.

A positive electrode included a positive electrode active material composition containing a positive electrode active material, a conductive auxiliary agent, a binder, and a dispersion solvent supported on a positive electrode collector. The positive electrode generally has a sheet shape.

The positive electrode may be produced by, for example, a method in which a positive electrode active material composition is applied to a positive electrode current collector by doctor-blading or a positive electrode current collector is immersed in a positive electrode active material composition, and then the workpiece is dried; a method in which a positive electrode active material composition is kneaded, formed into a sheet, and dried, the sheet and a positive electrode collector are joined together with an electrically conductive adhesive, and the resulting workpiece is pressed and dried; and a method in which a positive electrode active material composition containing a liquid lubricant is applied to or cast on a positive electrode collector, the coated collector is formed into a desired shape, the liquid lubricant is removed, and the collector is stretched uniaxially or multiaxially.

The positive electrode current collector may be formed from any material, and it can be formed from, for example, a conductive metal such as aluminum, aluminum alloy, stainless steel, or titanium. Preferred among these is aluminum because aluminum is easily formed into a thin film and is inexpensive.

The positive electrode active material may be any known positive electrode active material capable of occluding and releasing ions. Specific examples of the positive electrode active material include a transition metal oxide such as a ternary oxide represented by $MCoO_2$, $MNiO_2$, $MMnO_2$, $MNi_{1-x-y}Co_xMn_yO_2$, or $MNi_{1-x-y}Co_xAl_yO_2$ ($0 \leq x \leq 1$, $0 \leq y \leq 1$); nickel manganic acid represented by $M_xNi_yMn_{(2-y)}O_4$ ($0.9 \leq x \leq 1.1$, $0 < y < 1$); a compound having an olivine structure, such as $MAPO_4$ (A=Fe, Mn, Ni, Co); a solid solution material containing two or more transition metals (a solid solution of $M_2MnO_3$ which is electrochemically inert and in the form of a laminate and MM"O which is electrochemically active and in the form of a laminate (wherein M" is a transition metal such as Co or Ni, and M is an alkali metal ion). These positive electrode active materials may be used alone or in combination of two or more thereof.

Examples of the conductive auxiliary agent include acetylene black, carbon black, graphite, metal powder materials, single-walled carbon nanotube, multi-walled carbon nanotube, and vapor grown carbon fibers.

Examples of the binder include fluororesin such as polyvinylidene fluoride or polytetrafluoroethylene; synthetic rubber such as styrene-butadiene rubber or nitrile-butadiene rubber; polyamide resin such as polyamide-imide; polyolefin resin such as polyethylene or polypropylene; poly (meth)acrylic resin; polyacrylic acid; and cellulose resin such as carboxymethyl cellulose. These binders may be used alone, or a mixture of two or more thereof may be used. Each binder may be dissolved or dispersed in a solvent for use.

The amounts of the conductive auxiliary agent and the binder to be added may be appropriately adjusted in view of the intended use of the cell (e.g., use with emphasis on output or energy) and ionic conductivity, for example.

Examples of the solvent contained in the positive electrode active material composition used to produce the positive electrode include N-methylpyrrolidone, dimethylformamide, dimethylacetamide, methyl ethyl ketone, tetrahydrofuran, acetonitrile, acetone, ethanol, ethyl acetate, and water. These solvents may be used in combination. The amount of the solvent is not limited, and it may be appropriately determined according to the production method or the material to be used.

A negative electrode active material may be a known negative electrode active material for cells, capable of occluding and releasing ions. Specific examples of the negative electrode active material include alkali metals; metal alloys such as an alkali metal-aluminum alloy; graphite materials such as artificial graphite and natural graphite; a mesophase burned substance made from coal or petroleum pitch; carbon materials such as non-graphitizable carbon; Si-containing negative electrode materials such as Si, Si alloys, and SiO; and Sn-containing negative electrode materials such as Sn alloys.

A negative electrode may be produced by the same production method as the method for producing the positive electrode. The conductive auxiliary agent, the binder, the solvent for dispersing the materials used to produce the negative electrode may be the same as those used to produce the positive electrode.

The electrolyte composition of the present invention serving as a binder may be mixed with a positive electrode material slurry or a negative electrode material slurry, and then the mixture may be applied to a substrate; or an electrolyte solution containing the electrolyte composition of the present invention may be applied to a substrate to which a positive electrode material slurry or a negative electrode material slurry has been applied and dried.

The electrolyte composition of the present invention may be used in combination with, for example, a polymer solid electrolyte, an inorganic solid electrolyte, and/or a molten salt as an electrolyte. In particular, use of the electrolyte composition of the present invention is preferred.

<Cell>

The present invention also relates to a cell including the electrolyte membrane of the present invention and/or the electrode of the present invention.

The cell of the present invention preferably includes the electrolyte membrane of the present invention as a separator. Specifically, the cell of the present invention is preferably a secondary cell including a positive electrode, a negative electrode, and an electrolyte membrane between the electrodes, the electrolyte membrane being contained in an outer packaging case together with components such as the positive electrode and the negative electrode.

The cell of the present invention may have any shape known as a shape of a cell, such as a cylindrical shape, a square shape, a laminate shape, a coin shape, or a large-size shape. When the cell is used as a high-voltage supply of several dozen volts to several hundred volts for a electric vehicle, a hybrid electric vehicle, and the like, the cells may be connected in series to be a cell module.

The cell is preferably an alkali metal cell, and an alkali metal cell including at least one of the electrolyte membrane of the present invention or the electrode of the present invention is another aspect of the present invention. It is a preferred embodiment of the present invention that the electrolyte membrane containing the electrolyte composition of the present invention is an electrolyte membrane for alkali metal cells or the electrode containing the electrolyte composition of the present invention is an electrode for alkali metal cells. The cell is more preferably a secondary cell, and it is a preferred embodiment of the present invention that the cell is a lithium ion secondary cell.

[Method for Evaluating Electrolyte Composition]

The present invention also relates to a method for evaluating an electrolyte composition containing an alkali metal salt, the method including applying a direct current between two alkali metal pieces with an electrolyte composition in between to determine a resistance value from a voltage rise value and a current value.

The evaluation method can determine the ionic conductivity in the entire process in which alkali metal ions migrate from one alkali metal piece to the other alkali metal piece through the electrolyte composition as a DC ionic conductance. Thus, the evaluation method of the present invention can simply evaluate the performance of a cell such as an alkali metal cell including the electrolyte composition. That is, it is also a preferred embodiment of the present invention that the evaluation method is a method for evaluating an electrolyte composition for alkali metal cells.

The evaluation method of the present invention can evaluate any electrolyte composition containing an alkali metal salt.

The alkali metal may be lithium, sodium, potassium, rubidium, cesium, or francium. Preferred are lithium and sodium, with lithium being more preferred. In addition to the electrolyte composition of the present invention, the evaluation method can evaluate electrolyte compositions commonly used for cells.

The electrolyte composition may be in any form as long as it can be disposed between the alkali metal pieces. The electrolyte composition is preferably in the form of a measurement object consisting of the electrolyte composition itself or a measurement object containing the electrolyte composition, such as an electrolyte membrane including the electrolyte composition and a support.

The measurement object is preferably an electrolyte membrane.

The electrolyte membrane may include any type of support. For example, the above separator may be used. The electrolyte membrane may be produced by any method, and it may be produced by the above method, for example.

The ionic conductivity in the evaluation method of the present invention can be determined as a DC ionic conductance $\Delta\sigma_{DC}$(S/cm), which is specifically calculated using the following formula (6):

$$\Delta\sigma_{DC}=T/A/(\Delta E/I) \qquad (6)$$

wherein T (cm) is the thickness of a measurement object; A (cm²) is the area of the measurement object sandwiched between alkali metal pieces; I (A) is a direct current applied; and $\Delta E$ (V) is a voltage rise value that is a difference in voltage between the voltage value at a current application time of 0 minutes and that of t minutes.

EXAMPLES

Hereinafter, the present invention will be described in more detail based on the examples which, however, are not intended to limit the scope of the present invention. Here, "part(s)" refer(s) to "part(s) by weight", "%" refers to "% by mass", and "Mw" refers to "weight average molecular weight", unless otherwise specified. Further, "liter" is sometimes abbreviated simply by "L", and "mol/liter" is sometimes abbreviated simply by "M".

<Measurement Conditions of Weight Average Molecular Weight>

A calibration curve was obtained using a sample of polyethylene oxide having a standard molecular weight with a GPC apparatus (Tosoh Corporation, product name: HLC-8320 GPC, column: TSKgel G5000PW, TSKgel G4000PW, TSKgel G3000PW, TSKgel G2500PW (all available from Tosoh Corporation), eluent: mixture of acetonitrile/0.08 M aqueous solution of sodium acetate (volume ratio: 50/50)).

A polymerization reaction solution (containing polymer) obtained by the reaction was dissolved in a predetermined solvent, and the resulting solution was subjected to the measurement to determine Mw.

SYNTHESIS EXAMPLE 1

Synthesis of Polyethylene Oxide Polymer (A)

A 1-L autoclave reactor equipped with a stirrer, an inlet, and a temperature sensor was purged with nitrogen, and 335.3 parts of toluene dried over molecular sieves and 1.61 parts of t-butoxypotassium (1.0 M tetrahydrofuran solution) were sequentially put thereinto. The pressure in the reactor was increased up to a gauge pressure of 0.3 MPa by introducing nitrogen.

After the temperature in the reactor was increased to 95° C. with an oil bath, feeding of ethylene oxide was initiated at a feed rate of 1.12 parts/min. The ethylene oxide in an amount of 223.6 parts was continuously fed at 100° C.±5° C. over 350 minutes while the feed rate was appropriately controlled under monitoring and controlling of the increases in temperature and pressure in the reactor caused by polymerization heat. After completion of the feeding, the contents were aged at 100° C.±5° C. for 2 hours. After completion of the aging, the solvent was removed from the reaction mixture by vacuum devolatilization. Thus, a polyethylene oxide polymer (A) having a Mw of 110,000 was obtained.

SYNTHESIS EXAMPLE 2

Synthesis of Polyalkylene Oxide Copolymer (B)

A 1-L autoclave reactor equipped with a stirrer, an inlet, and a temperature sensor was purged with nitrogen, and 315 parts of toluene dried over molecular sieves and 0.97 parts of t-butoxypotassium (1.0 M tetrahydrofuran solution) were sequentially put thereinto. The pressure in the reactor was increased by introducing nitrogen so that the gauge pressure was 0.3 MPa.

After the temperature in the reactor was increased to 90° C. with an oil bath, feeding of ethylene oxide was initiated at a feed rate of 1.16 parts/min. The ethylene oxide was quantitatively fed for 40 minutes. After 20 minutes from the start of feeding of the ethylene oxide, feeding of butylene oxide dried over molecular sieves was initiated at a feed rate of 0.26 parts/min. The butylene oxide was quantitatively fed for 20 minutes. After 40 minutes from the start of feeding of the ethylene oxide, ethylene oxide and butylene oxide were quantitatively fed at a feed rate of 0.77 parts/min and at a feed rate of 0.17 parts/min, respectively, for 1 hour. After 1 hour and 40 minutes from the start of feeding of the ethylene oxide, additional ethylene oxide and additional butylene oxide were quantitatively fed at a feed rate of 0.58 parts/min and at a feed rate of 0.13 parts/min, respectively, for 1 hour and 20 minutes. After 3 hours from the start of feeding of the ethylene oxide, additional ethylene oxide was quantitatively fed at a feed rate of 0.39 parts/min for 2 hours. After 5 hours from the start of feeding of the ethylene oxide, additional ethylene oxide was quantitatively fed at a feed rate of 0.31 parts/min for 2.5 hours (total amount of ethylene oxide fed: 232.1 parts, total amount of butylene oxide fed: 25.8 parts). During the feeding, the reaction was performed at 100° C.±5° C. under monitoring and controlling of the increases in temperature and pressure in the reactor caused by polymerization heat. After completion of the feeding, the contents were aged at 100° C.±5° C. for 2 hours. After completion of the aging, the solvent was removed from the reaction mixture by vacuum devolatilization. Thus, a polyalkylene oxide copolymer (B) having a Mw of 115,000 was obtained.

SYNTHESIS EXAMPLE 3

Synthesis of Crosslinkable Group-Containing Polyalkylene Oxide Copolymer (C)

A 1-L autoclave reactor equipped with a stirrer, an inlet, and a temperature sensor was purged with nitrogen, and 286.5 parts of toluene dried over molecular sieves and 0.85 parts of t-butoxypotassium (1.0 M tetrahydrofuran solution) were sequentially put thereinto. The pressure in the reactor was increased by introducing nitrogen so that the gauge pressure was 0.3 MPa.

After the temperature in the reactor was increased to 90° C. with an oil bath, feeding of ethylene oxide was initiated at a feed rate of 0.85 parts/min. After 30 minutes from the start of feeding of the ethylene oxide, feeding of a monomer mixture (weight ratio: butylene oxide/allyl glycidyl ether=8/3) was initiated at a feed rate of 0.131 parts/min. After 2.5 hours from the start of feeding of the ethylene oxide, the feed rates of the ethylene oxide and the monomer mixture were reduced to 0.43 parts/min and 0.053 parts/min, respectively, and the ethylene oxide and the monomer mixture were quantitatively fed for additional 5 hours (total amount of ethylene oxide fed: 255 parts, total amount of monomer mixture fed: 31.5 parts). During the feeding, the reaction was performed at 100° C.±5° C. under monitoring and controlling of the increases in temperature and pressure in the reactor caused by polymerization heat. After completion of the feeding, the contents were aged at 100° C.±5° C. for 2 hours. After completion of the aging, the solvent was removed from the reaction mixture by vacuum devolatilization. Thus, a crosslinkable group-containing polyalkylene oxide copolymer (C) having a Mw of 104,000 was obtained.

EXAMPLE 1

Production of Electrolyte Membrane (1)

First, 0.8 g of lithium bis(fluorosulfonyl)imide (hereinafter, referred to as LiFSI) (Nippon Shokubai Co., Ltd.) as an electrolyte salt, 0.1 g of the polymer (A), and 0.1 g of succinonitrile (LBG, available from Kishida Chemical Co., Ltd.) were weighed into a PP vial (10 mL), and were combined with 1.6 mL of acetonitrile (LBG, available from Kishida Chemical Co., Ltd.). The mixture was heated and dissolved at 70° C. for 30 minutes with a thermostatic bath to prepare a desired solution (electrolyte solution). The electrolyte solution was uniformly applied to a cellulose separator (TF4425, available from Nippon Kodoshi Corporation, thickness: 25 μm) disposed on a Teflon (R) sheet, dried by heating with a hot air dryer at 40° C. for 1 hour, and dried under reduced pressure with a vacuum dryer at a degree of vacuum of −0.1 MPa in terms of absolute pressure at 70° C. for 2 hours. Thus, a 55-μm-thick composite electrolyte membrane including an electrolyte composition and the separator was obtained.

EXAMPLE 2

Production of Electrolyte Membrane (2)

A 52-μm-thick composite electrolyte membrane was obtained as in Example 1, except that the proportions were changed so that 0.8 g of LiFSI, 0.1 g of the polymer (A), 0.1 g of sulfolane (LBG, available from Kishida Chemical Co., Ltd.), and 1.6 mL of acetonitrile were used.

EXAMPLE 3

Production of Electrolyte Membrane (3)

A 71 μm-thick composite electrolyte membrane was obtained as in Example 1, except that the proportions were changed so that 0.8 g of lithium bis(trifluoromethanesulfonyl)imide (hereinafter, referred to as LiTFSI) (LBG, available from Kishida Chemical Co., Ltd.), 0.1 g of the polymer (A), 0.1 g of succinonitrile, and 1.0 mL of acetonitrile were used.

EXAMPLE 4

Production of Electrolyte Membrane (4)

A 61-μm-thick composite electrolyte membrane was obtained as in Example 1, except that the proportions were changed so that 0.6 g of LiFSI, 0.3 g of the polymer (A), 0.1 g of succinonitrile, and 1.6 mL of acetonitrile were used.

EXAMPLE 5

Production of Electrolyte Membrane (5)

A 50-μm-thick composite electrolyte membrane was obtained as in Example 1, except that the proportions were changed so that 0.6 g of LiFSI, 0.2 g of the polymer (A), 0.2 g of succinonitrile, and 1.6 mL of acetonitrile were used.

EXAMPLE 6

Production of Electrolyte Membrane (6)

A 50-μm-thick composite electrolyte membrane was obtained as in Example 1, except that the proportions were changed so that 0.6 g of LiFSI, 0.2 g of the polymer (B), 0.2 g of succinonitrile, and 1.0 mL of acetonitrile were used.

EXAMPLE 7

Production of Electrolyte Membrane (7)

First, 0.6 g of LiFSI, 0.3 g of the polymer (C), 0.1 g of succinonitrile, and 0.015 g of a polymerization initiator (ESACURE K1046, available from DKSH Japan K. K.) were weighed into a PP vial (10 mL), and were combined with 1.6 mL of acetonitrile. The mixture was heated and dissolved at 70° C. for 30 minutes with a thermostatic bath to prepare a desired electrolyte solution. The electrolyte solution was applied to a Teflon (R) sheet, and dried by heating with a hot air dryer at 40° C. for 30 minutes, and dried under reduced pressure with a vacuum dryer at a degree of vacuum of −0.1 MPa in terms of absolute pressure at 40° C. for 24 hours. Thus, the solvent was removed to obtain a membrane. The dried membrane was covered with a Teflon (R) sheet. Then, UV light was applied to each surface of the resulting product for 60 seconds with an ultra-high-pressure mercury lamp (4.2 mW/cm$^2$ (365 nm) which is a value of light having passed through the Teflon (R) sheet) to cause a photopolymerization reaction. Thus, a 110-μm-thick photo-cured membrane was obtained.

EXAMPLE 8

Production of Electrolyte Membrane (8)

A 47-µm-thick composite electrolyte membrane was obtained as in Example 1, except that the proportions were changed so that 0.8 g of LiFSI, 0.1 g of the polymer (A), 0.1 g of ethylene carbonate (LBG, available from Kishida Chemical Co., Ltd.), and 1.6 mL of acetonitrile were used.

EXAMPLE 9

Production of Electrolyte Membrane (9)

A 61-µm-thick composite electrolyte membrane was obtained as in Example 1, except that the proportions were changed so that 0.7 g of LiFSI, 0.2 g of the polymer (A), 0.1 g of ethylene carbonate, and 1.6 mL of acetonitrile were used.

EXAMPLE 10

Production of Electrolyte Membrane (10)

A 60-µm-thick composite electrolyte membrane was obtained as in Example 1, except that the proportions were changed so that 0.7 g of LiFSI, 0.15 g of the polymer (A), 0.15 g of ethylene carbonate, and 1.6 mL of acetonitrile were used.

EXAMPLE 11

Production of Electrolyte Membrane (11)

A 55-µm-thick composite electrolyte membrane was obtained as in Example 1, except that the proportions were changed so that 0.6 g of LiFSI, 0.2 g of the polymer (A), 0.2 g of ethylene carbonate, and 1.4 mL of acetonitrile were used.

COMPARATIVE EXAMPLE 1

Production of Comparative Electrolyte Membrane (1)

A 61-µm-thick composite electrolyte membrane was obtained as in Example 1, except that the proportions were changed so that 0.5 g of LiTFSI, 0.25 g of the polymer (A), 0.25 g of succinonitrile, and 1.0 mL of acetonitrile were used.

COMPARATIVE EXAMPLE 2

Production of Comparative Electrolyte Membrane (2)

A 69-µm-thick composite electrolyte membrane was obtained as in Example 1, except that the proportions were changed so that 0.6 g of LiFSI, 0.4 g of the polymer (A), and 1.6 mL of acetonitrile were used.

COMPARATIVE EXAMPLE 3

Production of Comparative Electrolyte Membrane (3)

A 38-µm-thick composite electrolyte membrane was obtained as in Example 1, except that the proportions were changed so that 0.2 g of LiTFSI, 0.8 g of the polymer (A), and 1.6 mL of acetonitrile were used.

COMPARATIVE EXAMPLE 4

Production of Comparative Electrolyte Membrane (4)

A 30-µm-thick photo-cured membrane was obtained as in Example 7, except that the proportions were changed so that 0.2 g of LiTFSI, 0.8 g of the polymer (C), 0.008 g a polymerization initiator, and 1.6 mL of acetonitrile were used.

The formulations of the electrolyte membranes obtained in Examples 1 to 11 and Comparative Examples 1 to 4 are shown in Table 1.

TABLE 1

| | Alkali metal salt | | Polymer | | | Ion dissociation accelerator | | | Separator | Concentration of alkali metal salt (mol/kg) |
| --- | --- | --- | --- | --- | --- | --- | --- | --- | --- | --- |
| | LiFSI | LiTFSI | (A) | (B) | (C) | Succinonitrile | Sulfolane | Ethylene carbonate | | |
| Example 1 | 80 | — | 10 | — | — | 10 | — | — | Present | 4.3 |
| Example 2 | 80 | — | 10 | — | — | — | 10 | — | Present | 4.3 |
| Example 3 | — | 80 | 10 | — | — | 10 | — | — | Present | 2.8 |
| Example 4 | 60 | — | 30 | — | — | 10 | — | — | Present | 3.2 |
| Example 5 | 60 | — | 20 | — | — | 20 | — | — | Present | 3.2 |
| Example 6 | 60 | — | — | 20 | — | 20 | — | — | Present | 3.2 |
| Example 7 | 60 | — | — | — | 30 | 10 | — | — | Absent | 3.2 |
| Example 8 | 80 | — | 10 | — | — | — | — | 10 | Present | 4.3 |
| Example 9 | 70 | — | 20 | — | — | — | — | 10 | Present | 3.7 |
| Example 10 | 70 | — | 15 | — | — | — | — | 15 | Present | 3.7 |
| Example 11 | 60 | — | 20 | — | — | — | — | 20 | Present | 3.2 |
| Comparative Example 1 | — | 50 | 25 | — | — | 25 | — | — | Present | 1.7 |
| Comparative Example 2 | 60 | — | 40 | — | — | — | — | — | Present | 3.2 |
| Comparative Example 3 | — | 20 | 80 | — | — | — | — | — | Present | 0.7 |
| Comparative Example 4 | — | 20 | — | — | 80 | — | — | — | Absent | 0.7 |

<Ionic Conductance and Evaluation of Ionic Conductivity>

A constant current application test was performed using a potentiostat/galvanostat (VSP-300, available from Bio-Logic Science Instruments). Each of the electrolyte membranes obtained in Examples 1 to 11 and Comparative Examples 1 to 4 was punched using a 11-mm-diameter punch to provide an electrolyte membrane piece. The piece was sandwiched between two 10-mm diameter lithium foils (0.2 mm in thickness, available from Honjo Metal Co., Ltd.). The resulting workpiece was sandwiched between two SUS316L separators (0.5 mm in thickness, 15.5 mm in diameter, available from Hohsen Corp.). The resulting product was fixed to the jig of the measuring apparatus. At a temperature of 60° C., the product was energized with a current $I_s$ of +0.0785 mA (0.1 mA/cm$^2$) for 5 minutes and with a current $I_s$ of −0.0785 mA for 5 minutes. Then, impedance analysis was performed using the same apparatus, and the bulk resistance value obtained from the Cole-Cole plot was taken as $R_b$ (Ω). The ionic conductance σ (S/cm) was calculated using the following equation (7):

$$\sigma = T/A/R_b \quad (7)$$

wherein T (cm) is the thickness of the measurement product, and A (cm$^2$) is the contact area between the electrolyte membrane piece and one lithium foil.

Subsequently, a constant current application test was performed at a current I of 0.157 mA. After 5-minute application of the current, the voltage rise value ΔE (V) was determined. The ionic conductivity in the entire process in which lithium ions migrate from one lithium foil to the other lithium foil facing thereto through the electrolyte membrane was indicated by the DC ionic conductance $\Delta\sigma_{DC}$ (S/cm), which was calculated using the following formula (6):

$$\Delta\sigma_{DC} = T/A/(\Delta E/I) \quad (6).$$

The results obtained using the formula (6) are shown in FIG. 1.

EXAMPLE 12

Formation of Lithium-Ion Secondary Cell (1)

First, 100 parts of LiNi$_{1/3}$Co$_{1/3}$Mn$_{1/3}$O$_2$ (Umicore) as a positive electrode active material, 3 parts of acetylene black (powder product, available from Denka Company Limited) as a conductive auxiliary agent, 3 parts of graphite powder (J-SP, available from Nippon Graphite Industries, Co., Ltd.), and 3 parts of polyvinylidene fluoride (#7200, available from Kureha Corporation) as a binder were dispersed in N-methylpyrrolidone (LBG, available from Kishida Chemical Co., Ltd.) to give a positive electrode mixture slurry. The positive electrode mixture slurry was uniformly applied to a carbon-coated aluminum foil (SDX-PM, available from Showa Denko packaging Co., Ltd.) as a positive electrode current collector, dried by heating with a hot air dryer at 70° C. for 30 minutes, and dried under reduced pressure with a vacuum dryer at a degree of vacuum of −0.1 MPa in terms of absolute pressure at 110° C. for 2 hours to remove the solvent. Thus, a positive electrode sheet was obtained having a positive electrode weight (excluding the aluminum foil) of 7.6 mg/cm$^2$.

The electrolyte solution prepared in Example 1 was uniformly applied to the positive electrode sheet, dried by heating with a hot air dryer at 40° C. for 30 minutes, and dried under reduced pressure with a vacuum dryer at a degree of vacuum of −0.1 MPa in terms of absolute pressure at 70° C. for 2 hours to remove the solvent. Thus, a composite positive electrode sheet impregnated with the composition was obtained.

The resulting composite positive electrode sheet was punched to provide a 14-mm-diameter positive electrode for a cell, the composite electrolyte membrane prepared in Example 1 was punched to provide a 16-mm-diameter electrolyte membrane sheet, and a 0.5-mm-thick lithium foil was punched to provide a 15-mm-diameter negative electrode. The lithium foil, two electrolyte membrane sheets, and the positive electrode were stacked in the stated order. The stack was swaged with a positive electrode case for a CR2032 coin cell (Hohsen Corp.), a negative electrode cap, a 0.5-mm-thick stainless steel spacer, a wave washer, and a gasket using an automatic coin cell crimper (Hohsen Corp.). Thus, a coin-type lithium-ion secondary cell was prepared.

EXAMPLE 13

Formation of Lithium-Ion Secondary Cell (2)

A coin-type lithium-ion secondary cell was prepared as in Example 12, except that the solution prepared in Example 5 and the composite electrolyte membrane obtained in Example 5 were used.

COMPARATIVE EXAMPLE 5

Formation of Comparative Lithium-Ion Secondary Cell (1)

A coin-type lithium-ion secondary cell was prepared as in Example 12, except that the solution prepared in Comparative Example 3 and the composite electrolyte membrane obtained in Comparative Example 3 were used.

<Evaluation of Lithium Ion Secondary Cell>

The coin-type lithium-ion secondary cells obtained in Examples 12 and 13 and Comparative Example 5 were each subjected to charging/discharging performance test with a charge/discharge tester (ACD-01, available from Aska Electronic Co., Ltd.). At a temperature of 60° C., each coin-type lithium-ion secondary cell was charged to 4.1 V under a charge condition of C/48 (the current value at which the cell including a positive electrode having a capacity of 160 mAh/g is fully charged in one hour is 1 C). After 15 minutes rest, the cell was discharged to 3 V under a discharge condition of C/12. Subsequently, the cell was charged to 4.1 V under a charge condition of C/48. After 15 minutes rest, the cell was discharged to 3 V under a discharge condition of C/4. The discharge curve in this case was made, and the discharge capacities were determined. The discharge curve is shown in FIG. 2, and the discharge capacity, $\Delta\sigma_{DC}$, and σ are shown in Table 2.

TABLE 2

|  | σ | $\Delta\sigma_{DC}$ | Discharge capacity (mAh) |
|---|---|---|---|
| Example 12 | 3.7 × 10$^{-4}$ | 1.1 × 10$^{-4}$ | 1.61 |
| Example 13 | 0.8 × 10$^{-4}$ | 2.9 × 10$^{-5}$ | 1.52 |
| Comparative Example 5 | 1.7 × 10$^{-4}$ | 1.6 × 10$^{-5}$ | 0.97 |

Figure 2:
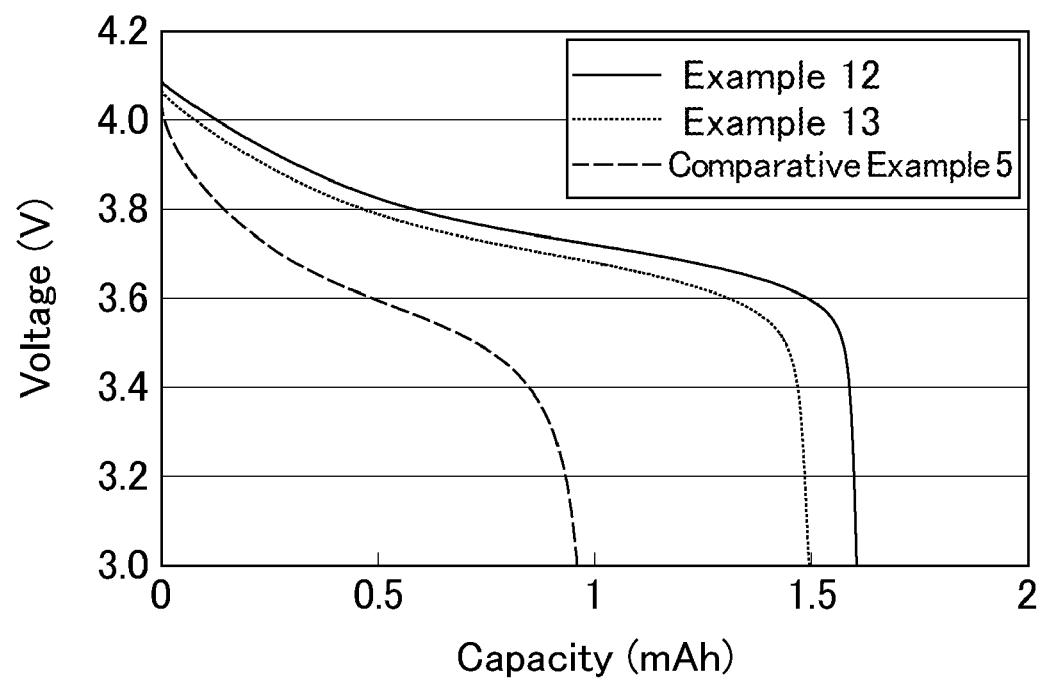
FIG. 2 shows discharge curves obtained by the charge/discharge tests for coin-type lithium-ion secondary cells produced in Examples 12 and 13 and Comparative Example 5.

FIG. 2 and Table 2 demonstrate that the lithium-ion secondary cells including the electrolyte composition of the present invention each have a higher discharge voltage and a higher discharge capacity than those of Comparative Example 5. These also demonstrate that the discharge capacity does not correlate with σ that has conventionally been used as an indicator of the performance of the electrolyte membrane, but correlates with the newly introduced indicator $\Delta\sigma_{DC}$. Specifically, the charging/discharging performance of each cell is more highly correlated with $\Delta\sigma_{DC}$ calculated from the lithium ionic conductivity during application of a direct current than with the σ value calculated from the resistance value in the high frequency region, revealing that it is important to evaluate the cell with $\Delta\sigma_{DC}$.

Coin-type lithium-ion secondary cells produced as in Example 12 and Comparative Example 5 were each charged to 4.1 V at a temperature of 60° C. under a charge condition of C/48. After 15 minutes rest, the cell was discharged to 3 V under a charge condition of C/12. Subsequently, the cell was charged to 4.1 V under a charge condition of C/48 and cooled to 25° C. After 3 hours rest, the cell was discharged to 3 V under a charge condition of C/48. The resulting discharge capacities are shown in Table 3.

TABLE 3

|  | Discharge capacity at 25° C. (mAh) |
|---|---|
| Example 12 | 1.44 |
| Comparative Example 5 | 0.18 |

Table 3 demonstrates that the lithium-ion secondary cell using the electrolyte composition of the present invention has excellent discharging performance even at 25° C.

The invention claimed is:

1. An electrolyte composition comprising:
an alkali metal salt represented by the formula LiN(FSO$_2$)$_2$;
at least one polymer selected from the group consisting of a polyether polymer, a (meth)acrylic polymer, a nitrile polymer, and a fluoropolymer; and
an ion dissociation accelerator, wherein:
(A) a concentration of the alkali metal salt is 3.2 mol/kg or higher and 4.6 mol/kg or lower;
(B) an amount of the polymer is 5% to 30% by mass of the electrolyte composition; and
(C) an amount of the ion dissociation accelerator is 5% to 30% by mass of the electrolyte composition.

2. The electrolyte composition according to claim 1, wherein the polymer includes a polyether polymer containing a structural unit derived from ethylene oxide.

3. The electrolyte composition according to claim 1, wherein the ion dissociation accelerator contains at least one selected from the group consisting of a nitrile compound and a sulfonyl compound.

4. The electrolyte composition according to claim 3, wherein the nitrile compound is a dinitrile compound represented by the following formula (2):

(2)

wherein R$^3$ is a C1-C6 alkylene group or a C6-C10 arylene group.

5. The electrolyte composition according to claim 1, wherein the ion dissociation accelerator is ethylene carbonate.

6. An electrolyte membrane comprising the electrolyte composition according to claim 1.

7. The electrolyte membrane according to claim 6, further comprising a separator.

8. The electrolyte membrane according to claim 7, wherein the separator includes at least one selected from the group consisting of a cellulose non-woven fabric, a PET non-woven fabric, a glass non-woven fabric, a polyolefin non-woven fabric, a polyolefin microporous membrane, and a polyimide porous membrane.

9. An electrode comprising the electrolyte composition according to claim 1.

10. An alkali metal cell comprising at least one selected from the group consisting of an electrolyte membrane comprising the electrolyte composition according to claim 1, and an electrode comprising the electrolyte composition according to claim 1.

* * * * *